(12) United States Patent
Kondabathini et al.

(10) Patent No.: US 11,600,066 B2
(45) Date of Patent: Mar. 7, 2023

(54) METHOD, ELECTRONIC DEVICE AND SOCIAL MEDIA SERVER FOR CONTROLLING CONTENT IN A VIDEO MEDIA STREAM USING FACE DETECTION

(71) Applicant: Sony Corporation, Tokyo (JP)

(72) Inventors: Vishal Kondabathini, Lund (SE); Stellan Nordström, Lund (SE); Håkan Nygren, Lund (SE); Steven Guan, Lund (SE)

(73) Assignee: Sony Group Corporation, Tokyo (JP)

( * ) Notice: Subject to any disclaimer, the term of this patent is extended or adjusted under 35 U.S.C. 154(b) by 168 days.

(21) Appl. No.: 16/962,433

(22) PCT Filed: Feb. 14, 2019

(86) PCT No.: PCT/IB2019/051191
§ 371 (c)(1),
(2) Date: Jul. 15, 2020

(87) PCT Pub. No.: WO2019/175685
PCT Pub. Date: Sep. 19, 2019

(65) Prior Publication Data
US 2020/0364460 A1 Nov. 19, 2020

(30) Foreign Application Priority Data
Mar. 14, 2018 (SE) .................................... 1850280-7

(51) Int. Cl.
*G06V 20/30* (2022.01)
*G06Q 50/00* (2012.01)
(Continued)

(52) U.S. Cl.
CPC ............. *G06V 20/30* (2022.01); *G06Q 50/01* (2013.01); *G06V 40/161* (2022.01);
(Continued)

(58) Field of Classification Search
CPC .... G06V 20/30; G06V 40/161; G06V 40/168; G06V 40/173; G06V 40/172;
(Continued)

(56) References Cited

U.S. PATENT DOCUMENTS

2011/0182482 A1 7/2011 Winters et al.
2012/0054838 A1 * 3/2012 Kim ..................... H04W 12/08
726/4
(Continued)

FOREIGN PATENT DOCUMENTS

EP 2902941 A1 8/2015
EP 3110161 A1 * 12/2016 ............. G06F 16/54
(Continued)

OTHER PUBLICATIONS

Swedish Search Report from corresponding Swedish Application No. 1850280-7, dated Nov. 19, 2018, 9 pages.
(Continued)

*Primary Examiner* — Asghar H Bilgrami
(74) *Attorney, Agent, or Firm* — Tucker Ellis LLP (57) ABSTRACT

Controlling content in a video media stream is presented. The controlling comprises: imaging a scene with a camera (42) of an electronic device (10); detecting, using a face detection function (22, 113), one or more faces present in the imaged scene; identifying, using an identity recognition function (23, 114), an individual having a face from among the one or more detected faces by determining that the face is a face of an individual having a social relationship on social media with a user of the electronic device (10); seeking approval, using an approval function (24, 115), from the identified individual to participate in the video media stream; and upon an approval from the identified individual to participate in the video media stream, generating the video media stream, using the camera (42) of the electronic
(Continued)

device (10), with the face of the identified individual being visible.

8 Claims, 3 Drawing Sheets

(51) Int. Cl.
  *G06V 40/16* (2022.01)
  *H04N 21/4223* (2011.01)
  *H04N 21/44* (2011.01)
  *H04N 21/454* (2011.01)
  *H04N 5/232* (2006.01)
  *H04N 21/4788* (2011.01)
  *G06F 21/32* (2013.01)
  *H04N 21/4415* (2011.01)

(52) U.S. Cl.
  CPC .......... *G06V 40/168* (2022.01); *G06V 40/173* (2022.01); *H04N 21/4223* (2013.01); *H04N 21/44008* (2013.01); *H04N 21/4542* (2013.01)

(58) Field of Classification Search
  CPC ............... G06Q 50/01; H04N 21/4223; H04N 21/44008; H04N 21/4542; H04N 5/232; H04N 21/4788; H04N 21/4415; G06F 21/32
  See application file for complete search history.

(56) References Cited

U.S. PATENT DOCUMENTS

| | | | |
|---|---|---|---|
| 2012/0114199 A1 | 5/2012 | Panyam et al. | |
| 2013/0077833 A1 | 3/2013 | Kritt et al. | |
| 2013/0121540 A1 | 5/2013 | Garcia et al. | |
| 2014/0086493 A1* | 3/2014 | Kothari | G06V 40/16 382/195 |
| 2015/0213305 A1* | 7/2015 | Sundstrom | H04N 5/232945 382/118 |
| 2015/0227609 A1* | 8/2015 | Shoemaker | G06V 40/173 707/737 |
| 2018/0083978 A1* | 3/2018 | Pantazelos | G06V 40/172 |
| 2019/0012382 A1* | 1/2019 | Minkovicz | G11B 27/28 |

FOREIGN PATENT DOCUMENTS

| | | | |
|---|---|---|---|
| EP | 3110161 A1 | 12/2016 | |
| WO | WO-2021119662 A1 * | 6/2021 | ........... G06F 40/169 |

OTHER PUBLICATIONS

International Search Report and Written Opinion from corresponding International Application No. PCT/IB2019/051191, dated Apr. 3, 2019, 13 pages.

* cited by examiner

METHOD, ELECTRONIC DEVICE AND SOCIAL MEDIA SERVER FOR CONTROLLING CONTENT IN A VIDEO MEDIA STREAM USING FACE DETECTION

TECHNICAL FIELD

The present invention relates to controlling content in a video media stream. The present invention further relates to an electronic device and a social media server used for controlling content in a video media stream.

BACKGROUND

Video media streams may pose a threat to the privacy of participants in the video media stream. For example, video media streams may be misused by digital media generators. Sometimes content of a video media stream may have depressing consequences leading to a threatening impact on an individual participating in a video media stream. Hence, there is a need for controlling content in a video media stream.

SUMMARY OF THE INVENTION

In view of the above, it is an object of the present invention to provide a controlling of content in a video media stream. Especially to provide controlling of content in a video media stream so that individuals not approving presence in the video media stream will not be present in the video media stream.

According to a first aspect a method for controlling content in a video media stream is provided. The method comprises:

imaging a scene with a camera of an electronic device;

detecting, using a face detection function, one or more faces present in the imaged scene;

identifying, using an identity recognition function, an individual having a face from among the one or more detected faces by determining that the face is a face of an individual having a social relationship on social media with a user of the electronic device;

seeking approval, using an approval function, from the identified individual to participate in the video media stream; and upon an approval from the identified individual to participate in the video media stream, generating the video media stream, using the camera of the electronic device, with the face of the identified individual being visible.

An individual having a face from among the one or more detected faces by determining that the face is a face of individual having a social relationship on social media with a user of the electronic device may be interpreted as an individual identified by determining that the detected face matches the face of an individual for which there exists a social relationship on social media between the individual and the user of the electronic device.

By determining that a face in a video media stream is a face of an individual having a social relationship on social media with a user of the electronic device an easy and reliable way for controlling content in the video media stream may be provided. It may be easy to seek approval from individuals to participate in a video media stream.

The method may further comprise: upon a non-approval from the identified individual to participate in the video media stream, generating the video media stream with the face of the identified individual being masked using a masking function. The masking may be a privacy masking. Privacy masking is a feature which is used to protect personal privacy by concealing or covering parts of the video media stream from view with a masked area. By masking faces of individuals not approving participation in the video media stream personal integrity may be improved.

The act of generating the video media stream may comprise masking, using a masking function, faces present in the imaged scene, for which an approval to participate in the video media stream has not been given. Hence, accidental participation of individuals in the video media stream may be avoided. Further, by this "automatic" masking, approval from one or more individuals is not a condition for starting the generation. For example, generation of a video media stream may start with all faces masked. After approval from an individual the face of the individual approving participation may be unmasked.

The act of identifying an individual having a face from among the one or more detected faces may be performed by accessing a database comprising facial features of individuals having a social relationship on social media with the user of the electronic device. A reliable and easy way of performing identification of individuals may hence be provided.

The act of seeking approval from the identified individual to participate in the video media stream may comprise checking an approval entry in the database. This facilitates a quick approval or non-approval for participation in video media streams. A user of a social media service may beforehand approve or disapprove a social contact on the social media service to generate a video media stream with the user participating. The approval entry in the database may comprise conditional entries, e.g. the user may allow a social contact to generate a video media stream with the user participating during predetermined time periods, e.g. time of the day, and/or day of the week. The conditional entries may, alternatively, or in addition, be that the user may allow a social contact to generate a video media stream with the user participating when the user is at one or more predetermined locations, e.g. the user may allow participation in a video media stream when the user is at home but not at work. The position of the user may be determined by determining a position, e.g. using a GPS, of a device linked to the user.

The database may be stored on the electronic device. A quick access to the database may be facilitated. Further access to the database may be made without the need of sending any information of a communications network. Hence, bandwidth on the communications network may be saved. Further, battery power may also be saved since a radio circuit of the electronic device may not be used as much.

The database may be stored on a social media server. In that case the act of identifying comprises: sending an identity request from the electronic device to the social media server, the identity request comprises information pertaining to facial features of the detected face; and determining, at the social media server, the identity of the individual having the detected face. This may facilitate updating of the database since one centralized database on the social media server may be kept up to date.

The act of seeking approval from the identified individual to participate in the video media stream may comprise sending a request for approval to an electronic device linked to the identified individual. Explicit approval for each time a video media stream is to be generated may be found.

The method may further comprise: detecting, using the face detection function, a new face in the scene while generating the video media stream; determining, using the identity recognition function, that the new face is a face of a new individual having a social relationship on social media with the user of the electronic device; seeking approval, using an approval function, from the new individual having the new face to participate in the video media stream; and upon an approval from the identified new individual having the new face to participate in the video media stream, generating the video media stream with the new face being visible. Hence, new individuals entering the scene may be asked for approval to participate in an ongoing generation of a video media stream.

According to a second aspect an electronic device is provided. The electronic device is linked to a user. The electronic device comprising:

a camera configured to image a scene; and
a control circuit configured to:
detect, using a face detection function, one or more faces present in the imaged scene;
identify, using an identity recognition function, an individual having a face from among the one or more detected faces by determining that the face is a face of an individual having a social relationship on social media with the user of the electronic device;
seek approval, using an approval function, from the identified individual to participate in the video media stream;
upon an approval from the identified individual to participate in the video media stream, generate a video media stream, using the camera of the electronic device, with the face of the identified individual being visible.

The control circuit of the electronic device may further be configured to upon a non-approval from the identified individual to participate in the video media stream, generate the video media stream with the face of the identified individual being masked using a masking function.

The control circuit of the electronic device may further be configured to generate the video media stream with faces present in the imaged scene, for which an approval to participate in the video media stream has not been given, masked, wherein the masking is made using a masking function.

The above mentioned features of the method, when applicable, apply to this second aspect as well. In order to avoid undue repetition, reference is made to the above.

According to a third aspect a social media server is provided. The social media server comprises:

a database of social relationships, the database comprising a plurality of entries, wherein each entry comprises facial features and thereto linked data pertaining to an individual of the face, and data pertaining to social relationships between individuals in the database;
a transceiver configured to, from an electronic device, receive an approval request seeking approval for an individual to participate in a video media stream, wherein the approval request comprises information pertaining to facial features; and
a control circuit configured to:
identify, by using an identity recognition function and by accessing the database, an individual by determining that the information pertaining to facial features belongs to an individual having a social relationship on social media with the user of the electronic device;
seek approval from the identified individual to participate in a video media stream;
wherein, upon an approval from the identified individual to participate in the video media stream, the transceiver is further configured to send an approval response to the electronic device instructing the electronic device to generate the video media stream with the face of the individual being visible.

The approval request may comprise data pertaining to an identity of a user of the electronic device. The data pertaining to an identity of a user of the electronic device may be used for finding entries in the database for individuals having a social relationship on social media with the user of the electronic device.

The control circuit of the social media server may further be configured to upon a non-approval from the identified individual to participate in the video media stream, the transceiver may further be configured to send an approval response to the electronic device instructing the electronic device to generate the video media stream with the face of the identified individual being masked using a masking function.

The control circuit of the social media server may be configured to seek approval from the identified individual to participate in the video media stream by checking an approval entry in the database.

The control circuit of the social media server may be configured to seek approval from the identified individual to participate in the video media stream by sending a request for approval to an electronic device linked to the identified individual.

The above mentioned features of the method, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
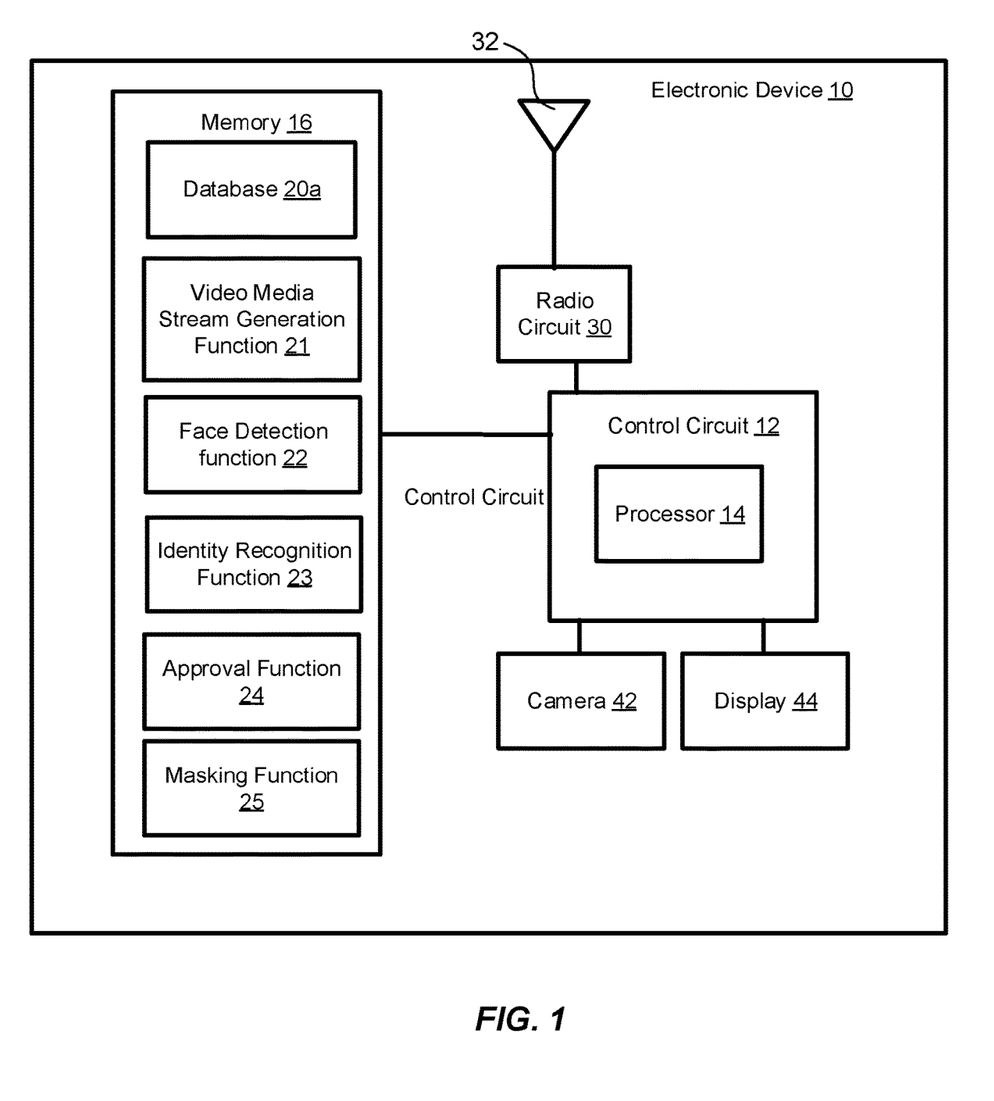
FIG. 1 illustrate an electronic device.

FIG. 1 illustrates an electronic device 10. The electronic device of the illustrated embodiment is a mobile telephone and will be referred to as the electronic device 10. It will be appreciated that, while embodiments described herein are described primarily in the context of a portable radio communications device such as the illustrated mobile telephone, the exemplary context of a mobile telephone is not the only operational environment in which aspects of the disclosed devices and methods may be used. What is described in this document may be applied to any type of appropriate electronic device, examples of which include a mobile telephone, a tablet computing device, a media player, a gaming device, a laptop or desktop computer, a video telephone, an electronic organizer, a personal digital assistant (PDA), a camera, a camcorder, etc.

The electronic device 10 may include a control circuit 12 that is configured to carry out overall control of functions and operations of the electronic device 10. The control circuit 12 may include a processor 14, such as a central processing unit (CPU), microcontroller, or microprocessor. The processor 14 is configured to execute program code stored in a memory 16, in order to carry out functions and operations of the electronic device 10.

The memory 16 may be one or more of a buffer, a flash memory, a hard drive, a removable media, a volatile memory, a non-volatile memory, a random access memory (RAM), or other suitable device. In a typical arrangement, the memory 16 may include a non-volatile memory for long term data storage and a volatile memory that functions as system memory for the control circuit 12. The memory 16 may exchange data with the control circuit 12 over a data bus. Accompanying control lines and an address bus between the memory 16 and the control circuit 12 also may be present.

The memory 16 may store a database 20a of individuals that are socially related to a user of the electronic device 10. Hence, the electronic device 10 may be linked to a specific user. The database 20a may be established, populated, and/or updated in accordance with the user's activity on one or more social media services. For example, the database 20a may include a listing of individuals categorized as the user's "friends" or "followers" on the one or more social media services. In addition, the database 20a may include information of such individuals, such as the specific relationship of the individual to the user (e.g., friend, family member, co-worker, etc.), photos of the individual, associated facial features of the individual, a listing of the social media services on which the individual and the user are connected, bibliographic data of the individual, and the like. The database 20a may alternatively or additionally be established, populated, and/or updated in accordance with data entered directly by the user of the electronic device 10. Alternatively, as will be discussed more in detail below, the database may, in full or in part, be stored elsewhere. For example, the database 20a may be stored in a social media server. According to another alternative the database 20a may be implemented using cloud computing.

The electronic device 10 includes communications circuitry that enables the electronic device 10 to establish communications with other device, such as servers and other electronic devices. The communications circuitry may include an antenna 32 coupled to a radio circuit 30. The radio circuit 30 may include a radio frequency transmitter and receiver for transmitting and receiving signals via the antenna 32. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 16, executing applications to allow user interaction with the data, displaying video and/or image content associated with the data, outputting audio sounds associated with the data, and so forth.

The functions and operations of the electronic device 10 may be embodied in the form of executable logic routines (e.g., lines of code, software programs, etc.) that are stored on a non-transitory computer readable medium (e.g., the memory 16) of the electronic device 10 and are executed by the control circuit 12 (e.g., using the processor 14). Furthermore, the functions and operations of the electronic device 10 may be a stand-alone software application or form a part of a software application that carries out additional tasks related to the electronic device 10. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The processor 14 may execute a video media stream generation function 21. The video media stream generation function 21 may be configured to control a camera 42 of the electronic device 10 to capture digital images to be used for generation of a video media stream. The camera 42 may be configured to image a scene and capture digital images. Accordingly, the video media stream generation function 20 may be configured to capture a video media stream of a scene with the camera 42 of the electronic device 10. The scene may include one or more faces of individuals. The video media stream generation function 21 may further be configured to display the video media stream on a display 44 of the electronic device 10. The video media stream generation function 21 may further be configured to livestream the video media stream on social media service, exemplary social media services include Facebook, Myspace, Google+, Twitter, LinkedIn, and the like. The video media stream generation function 21 may be configured to store the generated video media stream in the memory 16. Additional details and operation of the video media stream generation function 21 will be described in greater detail below.

The processor 14 may execute a face detection function 22. The face detection function 22 is configured to detect a face present in a video media stream of the scene. Face detection is a computer technology being used in a variety of applications that identifies human faces in digital images. Face detection is well known in the art, and the face detection function 22 may be configured to detect a face present in the scene using a suitable face detection algorithm. In one exemplary method, known as the Viola-Jones method, an image of a face is divided into rectangular blocks, based on a sum of luminosity values for groups of adjacent pixels, and then grouped to form features. The features within the image are compared against a database of features known to be indicative of a human face. The comparison may involve several iterations to increase face-detection accuracy. When the scene includes more than one face, the face detection function 22 may be used to detect multiple faces in the scene. Additional details and operation of the face detection function 22 will be described in greater detail below.

The processor 14 may execute an identity recognition function 23. The identity recognition function 23 is configured to recognize an identity of an individual based on facial features and finding matches with the facial features in a database of know individuals. Identity recognition is well known in the art, and the identity recognition function 23 may be configured to identify an individual present in the scene using a suitable identity recognition algorithm. This identity recognition may be performed using facial recognition. Facial recognition algorithms are well known in the art and commercially available. Such algorithms typically involve the comparison of facial features between the detected face and other detected faces in one or more other digital images. The identity recognition function 23 may determine that the detected face is the face of an individual having a social relationship with a user of the electronic device 10. This may e.g. be made by comparing the facial features of the detected face with facial features of individuals in the database 20a. The identity recognition function 23 may be configured to recognize the identity of an individual included in a digital image or in a video media stream. The identity recognition function 23 may be configured to extract facial features from a detected face. The identity recognition function 23 may be configured to compare facial features of an individual that is to be identified with facial features of individuals connected to the user (of the electronic device) on the one or more social media services. This by accessing the database 20a and in order to find a match. Hence, the identity recognition function 23 is configured to determine if a detected face corresponds to an individual that is socially related to the user of the electronic device 10. Hence, the identity recognition function 23 is configured to identify an individual which face is comprised among the one or more detected faces. Additional details and operation of the identity recognition function 23 will be described in greater detail below.

The processor 14 may execute an approval function 24. The approval function 24 is configured to seek approval from individuals present in the scene viewed by the camera 42 to participate in the video media stream. The approval function 24 may comprise checking an approval entry in the database of social relationships. The approval entry may be one or more of. Always approve a specific social contact to generate video media streams with "me" participating. Limit the approval to certain time periods, e.g. hours of the day, days of the week. Never approve a specific social contact to generate video media streams with "me" participating. The approval function 24 may comprise sending an approval request to an electronic device linked to an individual being identified in the scene. Additional details and operation of the approval function 24 will be described in greater detail below.

The processor 14 may execute a masking function 25. The masking function 25 is configured to mask out faces in a video media steam. Different masking methods is described in the prior art. Any of such method may be used. For example, the masking of a face may be made using constant coloring, smearing or pixelization. Masking of faces in video media stream is sometimes referred to as privacy masking. Additional details and operation of the masking function 25 will be described in greater detail below.

The processor 14 may execute other functions or operations of the electronic device 10 as well.

Figure 2:
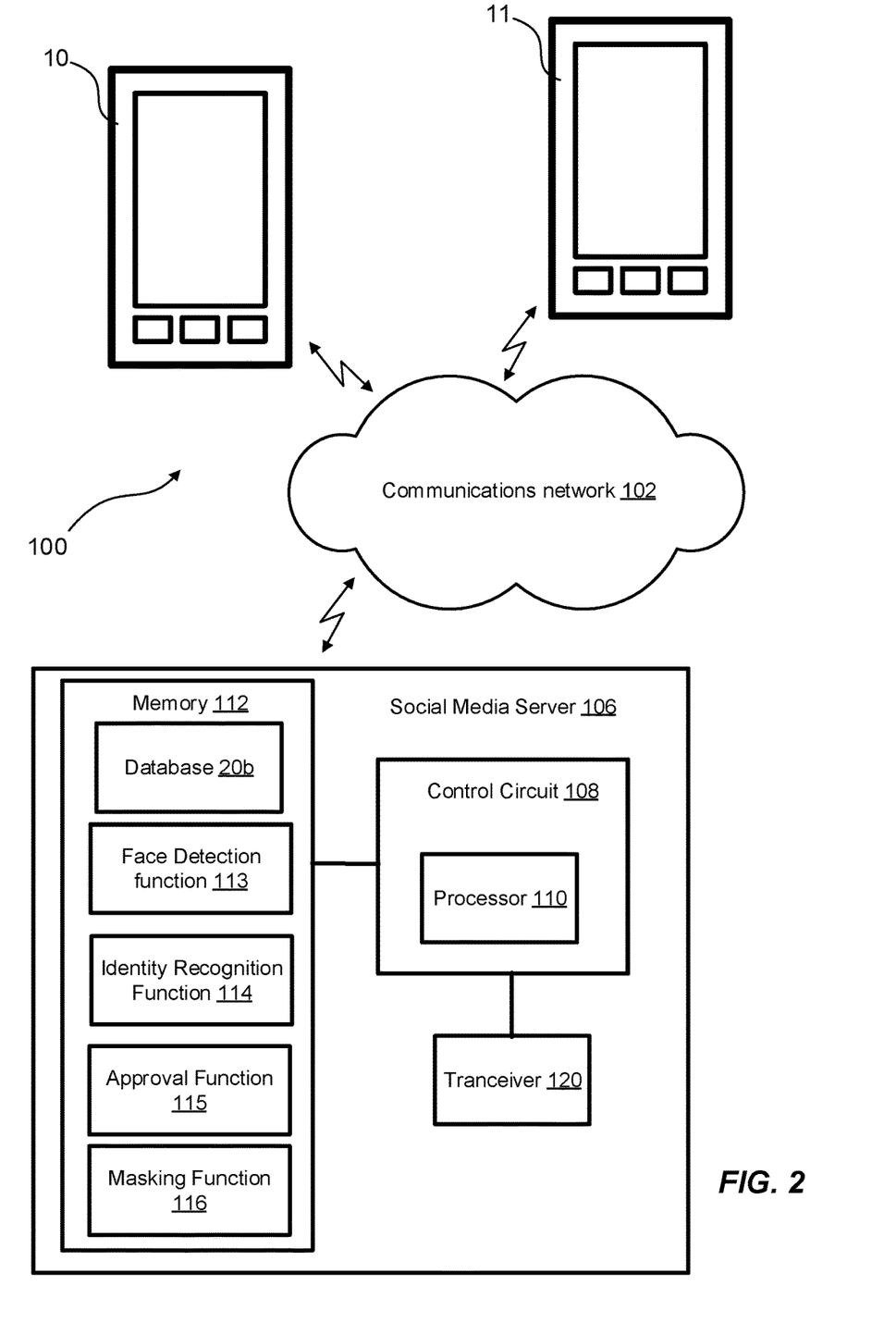
FIG. 2 illustrate a communications system comprising the electronic device.

With additional reference to FIG. 2, the radio circuit 24 may be configured to operate in a communications system 100. Radio circuit types for interaction with a mobile radio network and/or broadcasting network include, but are not limited to, global system for mobile communications (GSM), code division multiple access (CDMA), wideband CDMA (WCDMA), general packet radio service (GPRS), long term evolution (LTE), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 22 and the radio circuit 24 may represent one or more than one radio transceiver.

The communications system 100 may include a communications network 102. The communications network 102 communicates with the electronic device 10 via a transmission medium. The transmission medium may be any appropriate device or assembly, including, for example, a communications base station (e.g., a cellular service tower, or "cell" tower), a wireless access point, a satellite, etc. The communications network 102 may support the communications activity of multiple electronic devices and other types of end user devices.

The communications system 100 may further comprise a social media server 106. The social media server 106 may be in communication with the electronic device 10 and/or other electronic devices 11 via the communications network 102. For this the social media server 106 comprises a transceiver 120 configured to receive data from the communications network 102 and to send data to the communications network 102. The social media server 106 may be associated with one or more social media services. Exemplary social media services include Facebook, Myspace, Google+, Twitter, LinkedIn, and the like. The user of the electronic devices 10, 11 may have a profile or account with the one or more social media services, and access may be provided to the user's profile or account via the social media network server 106. The user of an electronic device 10, 11 may interact on the social media service by performing various functions such as posting updates/commentary, uploading/downloading media content, viewing posts and/or media content from other individuals, and the like. The communications system 100 as exemplified in FIG. 2 illustrates a single social media server 106. Other social media servers may be present, each associated with a respective social media service.

The social media server 106 may be configured as a computer system used to carry out several functions. The social media server 106 may include a control circuit 108 configured to carry out overall control of functions and operations of the social media server 106. The control circuit 108 may include a processor 110, such as a central processing unit (CPU), microcontroller, or microprocessor. The processor 110 is configured to execute code stored in a memory 112, in order to carry out operation of the social media server 106.

The memory 112 may be one or more of a buffer, a flash memory, a hard drive, a removable media, a volatile memory, a non-volatile memory, a random access memory (RAM), or other suitable device. In a typical arrangement, the memory 112 may include a non-volatile memory for long term data storage and a volatile memory that functions as system memory for the control circuit 108. The memory 112 may exchange data with the control circuit 108 over a data bus. Accompanying control lines and an address bus between the memory 112 and the control circuit 108 also may be present. The memory 112 is considered a non-transitory computer readable medium.

The memory 112 may store a database 20b of individuals that are socially related to the user of the electronic device 10. The database 20b may be established and updated in accordance with the user's activity on the one or more social media services. For example, the database 20b may include a listing of individuals classified as the user's "friends" or "followers" on the social media service. In addition, the database 116 may include information of these individuals, such as the specific relationship of the individual to the user (e.g., friend, family member, co-worker, etc.), photos of the individual, associated facial features of the individual, bibliographic data of the individual, and the like. The database 20b may alternatively or additionally be established, populated, and/or updated in accordance with data entered directly by the user of the electronic device 10 or user of other electronic devices 11 of the communications system 100. The database 20b may, in full or in part, be stored elsewhere. For example, the database 20b may in part be stored in the electronic device 10. According to another alternative the database 20b may be implemented using cloud computing.

The database 20a of the electronic device 10 and the database 20b of the social media server 106 may be portions of a same database 20.

The functions and operations of the social media server 106 may be embodied in the form of executable logic routines (e.g., lines of code, software programs, etc.) that are stored on a non-transitory computer readable medium (e.g., the memory 112) of the social media server 106 and are executed by the control circuit 108 (e.g., using the processor 110). Furthermore, the functions and operations of the social media server 106 may be a stand-alone software application or form a part of a software application that carries out additional tasks related to the social media server 106. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The processor 110 may execute one or more of a face detection function 113, an identity recognition function 114, an approval function 115 and a masking function 115. Each of these functions are set up in a similar fashion as has been described above in connection with the electronic device 10. In order to avoid undue repetition reference is made to the above. Further, any of these functions 113, 114, 115, 116 may be applied to data received from an electronic device 10, 11. For example, the identity recognition function 114 of the social media server 106 may receive an identity request from the electronic device 10. Further, any of these function may return information to the electronic device 10, 11. For example, the identity recognition function 114 of the social media server 106 may return an identity response to the electronic device 10 in response to the identity request. The functions 21, 22, 23, 24, 25 of the electronic device and the functions 113, 114, 115, 116 of the social media server 106 may work independently of each other. For example, some of the different functions may be run on the electronic device 10 and some of the functions may be run on the social media server 106. The electronic device and the social media server 106 may be configured to exchange data generated by the different functions. The functions 21, 22, 23, 24, 25 of the electronic device and the functions 113, 114, 115, 116 of the social media server 106 may work in tandem. For example, the identity recognition function 23 of the electronic device 10 may be used for identifying one or more individuals in the scene and the identity recognition function 114 of the social media server 106 may be used for identifying other one or more individuals in the scene. Hence, the identity recognition function 114 may be configured to identify an individual which face is comprised among the one or more detected faces.

The processor 110 of the social media server 106 may execute other functions or operations of the social media server 106 as well.

As described above, the video media stream generation function 21 may be configured to control a camera 42 of the electronic device 10 to image and capture a scene for generating a video media stream of a scene. The video media stream generation function 21 may be started in response to an initiation signal in the electronic device. The initiation signal may e.g. be a signal generated in response to a user command performed at the electronic device 10. Hence, the video media stream generation function 21 may be performed in response to a user command performed at the electronic device 10.

When imaging a scene with the camera 42, the video media stream generation function 21 may be configured to control the display 44 of the electronic device 10 to display the imaged scene. As such, the display 44 of the electronic device 10 may function as a viewfinder for the camera 42 prior to and/or during capture of the video media stream. The imaged scene may be displayed as a live video feed from the camera 42 that allows the user of the electronic device 10 to determine the field of view being imaged.

Prior to capturing the video media stream, one or more images of the scene may be used as a basis to detect the presence of one or more faces in the scene, the identity of one or more of the one or more detected faces, the social relationship of a recognized individual to the user of the electronic device 10, and/or seeking approval for participation in a video media stream from one or more of the individuals identified in the scene. Hence, the face detection function, the identity recognition function and/or the approval function may be performed on image data of the scene captured by the camera 42 prior to generating the video media stream. Accordingly, approval for participating in the video media stream may be found prior to generation of the video media stream.

Alternatively or in combination, while generating the video media stream of the scene, one or more images of the scene may be used as a basis to detect the presence of one or more faces in the scene, the identity of one or more of the one or more detected faces, the social relationship of a recognized individual to the user of the electronic device 10, and/or seeking approval for participation in a video media stream from one or more of the individuals identified in the scene. Hence, the face detection function, the identity recognition function and/or the approval function may be performed on image data of the scene captured by the camera 42 while generating the video media stream. Accordingly, approval for participating in the video media stream may be found while generation of the video media stream is ongoing.

The masking function may be configured to mask all faces in the video media stream for which no approval has been given. For example, in the beginning of e.g. a live stream of a video media stream some or all faces in the video media stream are masked by the masking function, then upon received approval from an individual in the scene the masking function is no longer making the face of the individual.

The face detection function 22, 113 may be configured to detect one or more faces present in the scene. The identity recognition function 23, 114 may be configured to determine the identity of one or more of the detected faces. For each detected face, the identity recognition function 23, 114 may be configured to recognize the identity of an individual having the detected face by determining a social relationship between the recognized individual and the user of the electronic device 10 used to capture the scene. The approval function 24, 115 may be configured to seek approval from the individuals identified in the scene. Based on the output from the approval function 24, 115 the masking function 25, 116 may mask out faces in the generated video media stream or not.

The identity recognition function 23 may be configured to perform facial recognition at the electronic device 10. When attempting to recognize a detected face in the scene, the identity recognition function 23 may draw from any number of sources for comparison. For example, the electronic device 10 may have stored within the memory 16 the database 20*a* of individuals and associated facial features. However, the database 20*b* stored at the social media server 106 may, alternatively or in combination, also be used. Hence, as part of identity recognition function 23, the electronic device 10 may be configured to request data from the database 116 of the social media server 106 when attempting to recognize a detected face in the scene. Upon multiple social media servers are connected to the electronic device 10, identity recognition function 23 may be configured to request data from the databases of a portion of or each of the connected social media servers.

The electronic device 10 may be configured to perform the identity recognition function by sending an identity request to the social media server 106 and receiving an identity response from the social media server 106. Hence, the identity recognition function 114 of the social media server 106 is used to identify at least some of the individuals in the scene. For example, the electronic device 10 may send an identity request to the identity recognition function 114 of the social media server 106. The identity request may comprise an identity of a user of the electronic device 10. The identity request may comprise information pertaining to facial features of the one or more detected faces. The information pertaining to facial features may comprise image data including one or more detected faces and/or facial features of the one or more detected faces. The identity recognition function 114 may be configured to compare the information pertaining to facial features of the one or more detected faces to individuals connected to the user on the social media service, and determine if one or more of the detected faces corresponds to an individual that is socially related to the user. The identity recognition function 114 may be configured to generate an identity response. The identity response may include the identity of each individual that is determined to correspond to a detected face. The identity response may also include information such as the specific relationship of the individual to the user. The identity request may be sent to multiple social media servers, each associated with a respective social media service. The identity recognition function 114 may send the identity response to the electronic device 10, and the electronic device 10 may receive the identity response.

The social media server 106 may be responsible for performing the approval function 115. In such cases the identity request may instead be seen as an approval request and the identity response may instead be seen as an approval response. The approval response sent to the electronic device then comprises information pertaining to if the identified individual approves to participate in the video media stream or not. The actual seeking for approval is performed in accordance with the approval function 115 as discussed above.

Alternatively, the social media server 106 may be responsible for performing the masking of faces of individuals not given their approval for participating in the video media stream. In such cases the video media stream is sent to the social media server 106 before being live streamed and/or before being saved at the social media server 106. The masking function 116 is performed on the social media server 106 before the video media stream being live streamed and/or before the video media stream being saved at the social media server 106.

Figure 3:
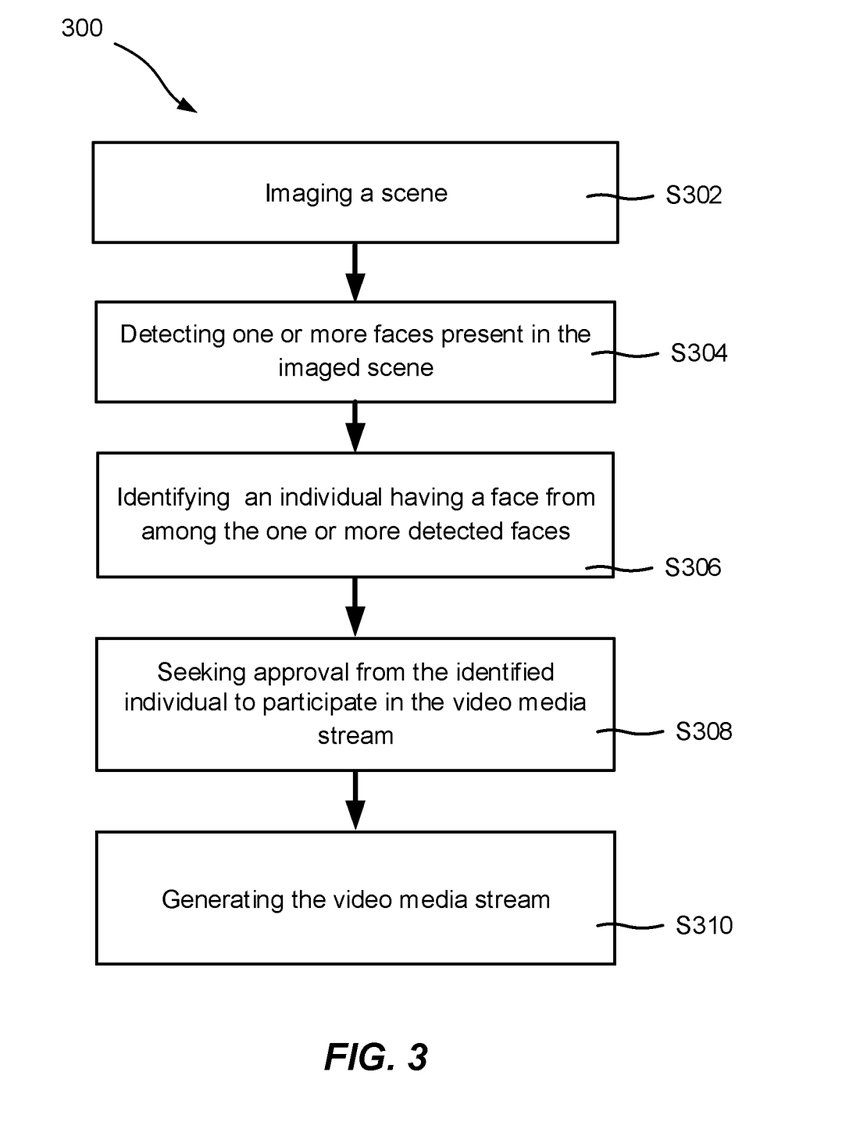
FIG. 3 is a block scheme of a method for controlling content in a video media stream.

With reference to FIG. 3 a method 300 for controlling content in a video media stream will be discussed. The method may be carried out by executing embodiments of the video media stream generation function 21, the face detection function 22, the identity recognition function 23, the approval function 24 and/or the masking function 25 of the electronic device 10 and/or embodiments of the face detection function 113, the identity recognition function 114, the approval function 115 and/or the masking function 116 of the social media server 106, for example. Although FIG. 3 show specific orders of acts of the method, the orders thereof may be changed relative to the order shown. Also, two or more acts shown in succession may be executed concurrently or with partial concurrence. Certain act also may be omitted.

The method 300 comprises the following acts.

Imaging S302 a scene with a camera 42 of an electronic device 10.

Detecting S304 one or more faces present in the imaged scene. The detecting S304 may be made using the face detection function 22 of the electronic device 10 and/or the face detection function 113 of the social media server 106.

Identifying S306 an individual having a face from among the one or more detected faces. The Identifying S306 being performed by determining that the face is a face of an individual having a social relationship on social media with a user of the electronic device 10. The identifying S306 may be made using the identity recognition function 23 of the electronic device 10 and/or the identity recognition function 114 of the social media server 106. The act of identifying S306 an individual having a face from among the one or more detected faces may be performed by accessing a database 20a, 20b comprising facial features of individuals having a social relationship on social media with the user of the electronic device 10. The database 20a may be stored on the electronic device 10. The database 20b may be stored on the social media server 106. The database may even be stored elsewhere as long as the database may be accessed by the identity recognition function 23 of the electronic device 10 and/or by the identity recognition function 114 of the social media server 106. According to one example, the act of identifying S306 may be made by sending an identity request from the electronic device 10 to the social media server 106 and determining, at the social media server 106, the identity of the individual having the detected face. The identity request may comprise information pertaining to facial features of the detected face. The identity request may comprise information pertaining to the identity of the user of the electronic device 10.

Seeking approval S308 from the identified individual to participate in the video media stream. The seeking approval S308 may be made using the approval function 24 of the electronic device 10 and/or the approval function 115 of the social media server 106. The act of seeking approval S308 may be made by checking an approval entry in the database 20a, 20b. The database 20a may be stored on the electronic device 10. The database 20b may be stored on the social media server 106. The database may even be stored elsewhere as long as the database may be accessed by approval function 24 of the electronic device 10 and/or the approval function 115 of the social media server 106. The act of seeking approval from the identified individual to participate in the video media stream may comprise sending a request for approval to an electronic device 11 linked to the identified individual. Such a request may be presented at the electronic device 11 linked to the identified individual as a question regarding if the user of the electronic device 11 want to participate in the video media stream or not. The electronic device 11 linked to the identified individual may be configured to send back a response to the request for approval informing the approval function 24 of the electronic device 10 and/or the approval function 115 of the social media server 106 if the identified individual approves participation or not.

Generating S310 the video media stream. The generating S310 may be made using the camera 42 of the electronic device 10. The generating S310 may be controlled using the video media stream generation function 21 of the electronic device 10. The act of generating the video media stream may comprise masking faces, present in the imaged scene, for which an approval to participate in the video media stream has not been given. The masking of a face may be made using the masking function 25 of the electronic device 10 and/or the masking function 116 of the social media server 106. Upon an approval from the identified individual to participate in the video media stream, the act of generating S310 the video media stream comprises generating the video media stream with the face of the identified individual being visible. Upon a non-approval from the identified individual to participate in the video media stream, the act of generating S310 the video media stream comprises generating the video media stream with the face of the identified individual being masked. Again, the masking of a face may be made using the masking function 25 of the electronic device 10 and/or the masking function 116 of the social media server 106.

The method may further comprise the following acts.

Detecting a new face in the scene while generating the video media stream. The act detecting the new face may be made like the act of detecting S304. In order to avoid undue repetition reference is made to the above.

Determining that the new face is a face of a new individual having a social relationship on social media with the user of the electronic device 10. The act of determining that the new face is a face of a new individual having a social relationship on social media with the user of the electronic device 10 may be made like the act of identifying S306. In order to avoid undue repetition reference is made to the above.

Seeking approval from the new individual having the new face to participate in the video media stream. The act of seeking approval from the new individual may be made like the act of seeking approval S308. In order to avoid undue repetition reference is made to the above.

Upon an approval from the identified new individual having the new face to participate in the video media stream, generating the video media stream with the new face being visible.

The person skilled in the art realizes that the present invention by no means is limited to the preferred embodiments described above. On the contrary, many modifications and variations are possible within the scope of the appended claims.

When imaging a scene with the camera 42, the video media stream generation function 21 may be configured to include one or more indicators on the displayed image. The one or more indicators may be included on the displayed image to indicate a social relationship of the individual to the user of the electronic device 10. The one or more indicators may include a shape such as a rectangle, circle, or other suitable shape that outlines and/or surrounds a recognized face. In some embodiments, the one or more indicators may include the name (identity) of a recognized individual. The one or more indicators may include one or more symbols, shapes, or colors representing the relationship of the user to the recognized individual. For example, depending on the social relationship (e.g., family, relative, co-worker, etc.), a respective symbol may be displayed on the display proximate the face of the individual (e.g., "f" for family, "r" for relative, and "c" for co-worker). As another example, the color and/or shape of the line outlining the individual's face may be different depending on the social relationship (e.g., family member outlined in blue, relative outlined in red, co-worker outlined in green). The one or more indicators may include symbols representing the social media connections that the recognized individual shares with the user of the electronic device 10. For example, the emblem or trademark of a social media service may appear proximate the face of the recognized individual to indicate the social network by which the user of the electronic device and the recognized individual is connected. If the individual and the user are connected by more than one social media service, more than one emblem or trademark may appear proximate the face of the user.

Additionally, variations to the disclosed embodiments can be understood and effected by the skilled person in practicing the claimed invention, from a study of the drawings, the disclosure, and the appended claims.

Itemized List of Embodiments:

Item 1. A method for controlling content in a video media stream, the method comprising:

imaging a scene with a camera (42) of an electronic device (10);

detecting, using a face detection function (22, 113), one or more faces present in the imaged scene;

identifying, using an identity recognition function (23, 114), an individual having a face from among the one or more detected faces by determining that the face is a face of an individual having a social relationship on social media with a user of the electronic device (10);

seeking approval, using an approval function (24, 115), from the identified individual to participate in the video media stream; and upon an approval from the identified individual to participate in the video media stream, generating the video media stream, using the camera (42) of the electronic device (10), with the face of the identified individual being visible.

Item 2. The method according to item 1, further comprising, upon a non-approval from the identified individual to participate in the video media stream, generating the video media stream with the face of the identified individual being masked using a masking function (25, 116).

Item 3. The method according to items 1 or 2, wherein the act of generating the video media stream comprises masking, using a masking function (25, 116), faces present in the imaged scene, for which an approval to participate in the video media stream has not been given.

Item 4. The method according to any one of items 1-3, wherein the act of identifying an individual having a face from among the one or more detected faces is performed by accessing a database (20a, 20b) comprising facial features of individuals having a social relationship on social media with the user of the electronic device.

Item 5. The method according to item 4, wherein the act of seeking approval from the identified individual to participate in the video media stream comprises checking an approval entry in the database (20a, 20b).

Item 6. The method according to item 4 or 5, wherein the database (20a) is stored on the electronic device (10).

Item 7. The method according to item 4 or 5, wherein the database (20b) is stored on a social media server (106), and wherein the act of identifying comprises:

sending an identity request from the electronic device (10) to the social media server (106), the identity request comprises information pertaining to facial features of the detected face; and determining, at the social media server (106), the identity of the individual having the detected face.

Item 8. The method according to any one of items 1-7, wherein the act of seeking approval from the identified individual to participate in the video media stream comprises sending a request for approval to an electronic device (11) linked to the identified individual.

Item 9. The method according to any one of items 1-8, further comprising:

detecting, using the face detection function (22, 113), a new face in the scene while generating the video media stream;

determining, using the identity recognition function (23, 114), that the new face is a face of a new individual having a social relationship on social media with the user of the electronic device (10);

seeking approval, using an approval function (24, 115), from the new individual having the new face to participate in the video media stream; and upon an approval from the identified new individual having the new face to participate in the video media stream, generating the video media stream with the new face being visible.

Item 10. An electronic device being linked to a user, the electronic device comprising:

a camera (42) configured to image a scene; and a control circuit (12) configured to:

detect, using a face detection function (22), one or more faces present in the imaged scene;

identify, using an identity recognition function (23), an individual having a face from among the one or more detected faces by determining that the face is a face of an individual having a social relationship on social media with the user of the electronic device;

seek approval, using an approval function (24), from the identified individual to participate in the video media stream;

upon an approval from the identified individual to participate in the video media stream, generate a video media stream, using the camera (42) of the electronic device, with the face of the identified individual being visible.

Item 11. The electronic device according to item 10, wherein the control circuit (12) is further configured to:

upon a non-approval from the identified individual to participate in the video media stream, generate the video media stream with the face of the identified individual being masked using a masking function (25, 116).

Item 12. The electronic device according to item 10 or 11, wherein the control circuit (12) is further configured to:

generate the video media stream with faces present in the imaged scene, for which an approval to participate in the video media stream has not been given, masked, wherein the masking is made using a masking function (25).

Item 13. A social media server comprising:

a database (20b) of social relationships, the database comprising a plurality of entries, wherein each entry comprises facial features and thereto linked data pertaining to an individual of the face, and data pertaining to social relationships between individuals in the database;

a transceiver (120) configured to, from an electronic device (10), receive an approval request seeking approval for an individual to participate in a video media stream, wherein the approval request comprises information pertaining to facial features; and a control circuit (108) configured to:

identify, by using an identity recognition function (114) and by accessing the database (20b), an individual by determining that the information pertaining to facial features belongs to an individual having a social relationship on social media with the user of the electronic device;

seek approval from the identified individual to participate in a video media stream;

wherein, upon an approval from the identified individual to participate in the video media stream, the transceiver (120) is further configured to send an approval response to the electronic device (10) instructing the electronic device (10) to generate the video media stream with the face of the individual being visible.

Item 14. The social media server according to item 13, wherein the approval request further comprises data pertaining to an identity of a user of the electronic device (10).

Item 15. The social media server according to item 13 or 14, wherein the control circuit (108) is further configured to:

upon a non-approval from the identified individual to participate in the video media stream, the transceiver (120) is further configured to send an approval response to the electronic device (10) instructing the electronic device (10)

to generate the video media stream with the face of the identified individual being masked using a masking function (25, 116).

Item 16. The social media server according to any one of items 13-15, wherein the control circuit (108) is configured to seek approval from the identified individual to participate in the video media stream by checking an approval entry in the database (20b).

Item 17. The social media server according to any one of items 13-15, wherein the control circuit (108) is configured to seek approval from the identified individual to participate in the video media stream by sending a request for approval to an electronic device (11) linked to the identified individual.

The invention claimed is:

1. A method for controlling content in a video media stream, the method comprising:
   imaging a scene with a camera of an electronic device;
   detecting, using a face detection function, one or more faces present in the imaged scene;
   identifying, using an identity recognition function, an individual having a face from among the one or more detected faces by determining that the face is a face of an individual having a social relationship on social media with a user of the electronic device;
   in response to identifying the individual, seeking approval, using an approval function, from the identified individual to participate in the video media stream, by sending a request for explicit approval for such video media stream to an electronic device linked to the identified individual; and
   upon receiving an explicit approval from the identified individual to participate in the video media stream, generating the video media stream, using the camera of the electronic device, with the face of the identified individual being visible, wherein the act of generating the video media stream comprises masking, using a mask function, faces present in the imaged scene, for which an explicit approval to participate in the video media stream has not been given, and upon receiving explicit approval from an individual in the imaged scene while generation of the video media stream is ongoing, stopping using the masking function to the face of the individual in the continued generation of the video media stream.

2. The method according to claim 1, further comprising, upon a non-approval from the identified individual to participate in the video media stream, generating the video media stream with the face of the identified individual being masked using the masking function.

3. The method according to claim 1, wherein the act of identifying an individual having a face from among the one or more detected faces is performed by accessing a database comprising facial features of individuals having a social relationship on social media with the user of the electronic device.

4. The method according to claim 3, wherein the database is stored on a social media server, and wherein the act of identifying comprises:
   sending an identity request from the electronic device to the social media server, the identity request comprises information pertaining to facial features of the detected face; and
   determining, at the social media server, the identity of the individual having the detected face.

5. The method according to claim 1, further comprising:
   detecting, using the face detection function, a new face in the scene while generating the video media stream;
   determining, using the identity recognition function, that the new face is a face of a new individual having a social relationship on social media with the user of the electronic device;
   seeking approval, using an approval function, from the new individual having the new face to participate in the video media stream; and
   upon an approval from the identified new individual having the new face to participate in the video media stream, generating the video media stream with the new face being visible.

6. An electronic device being linked to a user, the electronic device comprising:
   a camera configured to image a scene; and
   a control circuit configured to:
      detect, using a face detection function, one or more faces present in the imaged scene;
      identify, using an identity recognition function, an individual having a face from among the one or more detected faces by
      determining that the face is a face of an individual having a social relationship on social media with the user of the electronic device;
      in response to identifying the individual, seek approval, using an approval function, from the identified individual to participate in the video media stream, by sending a request for explicit approval for such video media stream to an electronic device linked to the identified individual;
      upon finding an explicit approval from the identified individual to participate in the video media stream, generate a video media stream, using the camera of the electronic device, with the face of the identified individual being visible, wherein the act of generating the video media stream comprises masking, using a mask function, faces present in the imaged scene, for which an explicit approval to participate in the video media stream has not been given, and upon receiving explicit approval from an individual in the imaged scene while generation of the video media stream is ongoing, stopping using the masking function to the face of the individual in the continued generation of the video media stream.

7. A social media server comprising:
   a database of social relationships, the database comprising a plurality of entries, wherein each entry comprises facial features and thereto linked data pertaining to an individual of the face, and data pertaining to social relationships between individuals in the database;
   a transceiver configured to, from an electronic device, receive an approval request seeking approval for an individual to participate in a video media stream, wherein the approval request comprises information pertaining to facial features; and
   a control circuit configured to:
      identify, by using an identity recognition function and by accessing the database, an individual by determining that the information pertaining to facial features belongs to an individual having a social relationship on social media with the user of the electronic device;
      in response to identifying the individual, seek approval from the identified individual to participate in a video media stream, by sending a request for explicit approval for such video media stream to an electronic device linked to the identified individual;

wherein, upon finding an explicit approval from the identified individual to participate in the video media stream, the transceiver is further configured to send an approval response to the electronic device instructing the electronic device to generate the ongoing video media stream with the face of the individual being visible.

8. The social media server according to claim 7, wherein the approval request further comprises data pertaining to an identity of a user of the electronic device.

\* \* \* \* \*